(12) United States Patent
Hagihara et al.

(10) Patent No.: US 11,539,862 B2
(45) Date of Patent: Dec. 27, 2022

(54) IMAGE PROCESSING FOR COLOR MATCHING BEFORE AND AFTER LAMINATION PRINTING

(71) Applicant: Seiko Epson Corporation, Tokyo (JP)

(72) Inventors: Naoki Hagihara, Shiojiri (JP); Takahiro Kamada, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/527,250

(22) Filed: Nov. 16, 2021

(65) Prior Publication Data
US 2022/0159146 A1      May 19, 2022

(30) Foreign Application Priority Data

Nov. 17, 2020    (JP) .............................. JP2020-190762

(51) Int. Cl.
     *H04N 1/60*           (2006.01)
     *G06F 3/12*            (2006.01)

(52) U.S. Cl.
     CPC ........... *H04N 1/603* (2013.01); *G06F 3/1208* (2013.01); *G06F 3/1242* (2013.01)

(58) Field of Classification Search
None
See application file for complete search history.

(56) References Cited

U.S. PATENT DOCUMENTS

2011/0216335 A1\*    9/2011   Horita .................... H04N 1/60
                                                         358/1.9

FOREIGN PATENT DOCUMENTS

| JP | 2011-182373 A | 9/2011 |
| JP | 2020-182050 A | 11/2020 |
| JP | 2020182050 A \* | 11/2020 |

\* cited by examiner

*Primary Examiner* — Andrew H Lam
(74) *Attorney, Agent, or Firm* — Harness, Dickey & Pierce, P.L.C.

(57) ABSTRACT

An image processing method includes: converting a device color CMYK1 that is an input device color depending on an input device into a device color CMYK2 that is an output device color depending on an output device; converting the device color CMYK2 into a spectral reflectance R1 using an output profile showing a relationship between the output device color and a spectral reflectance; converting the spectral reflectance R1 into a spectral reflectance R2, to be reproduced before lamination processing, using a mutual conversion formula of a spectral reflectance before lamination processing and a spectral reflectance after lamination processing; and calculating a device color CMYK3 that is an output device color using the spectral reflectance R2, the output profile, and light source information.

10 Claims, 9 Drawing Sheets

IMAGE PROCESSING FOR COLOR MATCHING BEFORE AND AFTER LAMINATION PRINTING

The present application is based on, and claims priority from JP Application Serial Number 2020-190762, filed Nov. 17, 2020, the disclosure of which is hereby incorporated by reference herein in its entirety.

BACKGROUND

1. Technical Field

The present disclosure relates to an image processing method and an image processing apparatus.

2. Related Art

JP-A-2011-182373 (PTL 1) discloses that a profile is created based on a characteristic before lamination processing and a characteristic after lamination processing, whether a target color can be reproduced is determined based on the profile, and a reproducible condition is evaluated based on whether reproduction can be performed.

However, in the method described in PTL 1, it is necessary to create and manage the profile after lamination processing, and time and effort are required. Therefore, there is a demand for a method and an apparatus for more easily performing color matching before and after lamination processing.

SUMMARY

An image processing method includes: converting an input device color depending on an input device into a first output device color that is an output device color depending on an output device; converting the first output device color into a first spectral reflectance using an output profile showing a relationship between the output device color and a spectral reflectance; converting the first spectral reflectance into a second spectral reflectance, to be reproduced before lamination processing, using a mutual conversion formula of a spectral reflectance before lamination processing and a spectral reflectance after lamination processing; and calculating a second output device color that is an output device color using the second spectral reflectance, the output profile, and light source information.

An image processing apparatus includes: a first conversion unit configured to convert an input device color depending on an input device into a first output device color that is an output device color depending on an output device; a second conversion unit configured to convert the first output device color into a first spectral reflectance using an output profile showing a relationship between the output device color and a spectral reflectance; a third conversion unit configured to convert the first spectral reflectance into a second spectral reflectance, to be reproduced before lamination processing, using a mutual conversion formula of a spectral reflectance before lamination processing and a spectral reflectance after lamination processing; and a device color calculation unit configured to calculate a second output device color that is an output device color using the second spectral reflectance, the output profile, and light source information.

DESCRIPTION OF EXEMPLARY EMBODIMENTS

Figure 1:
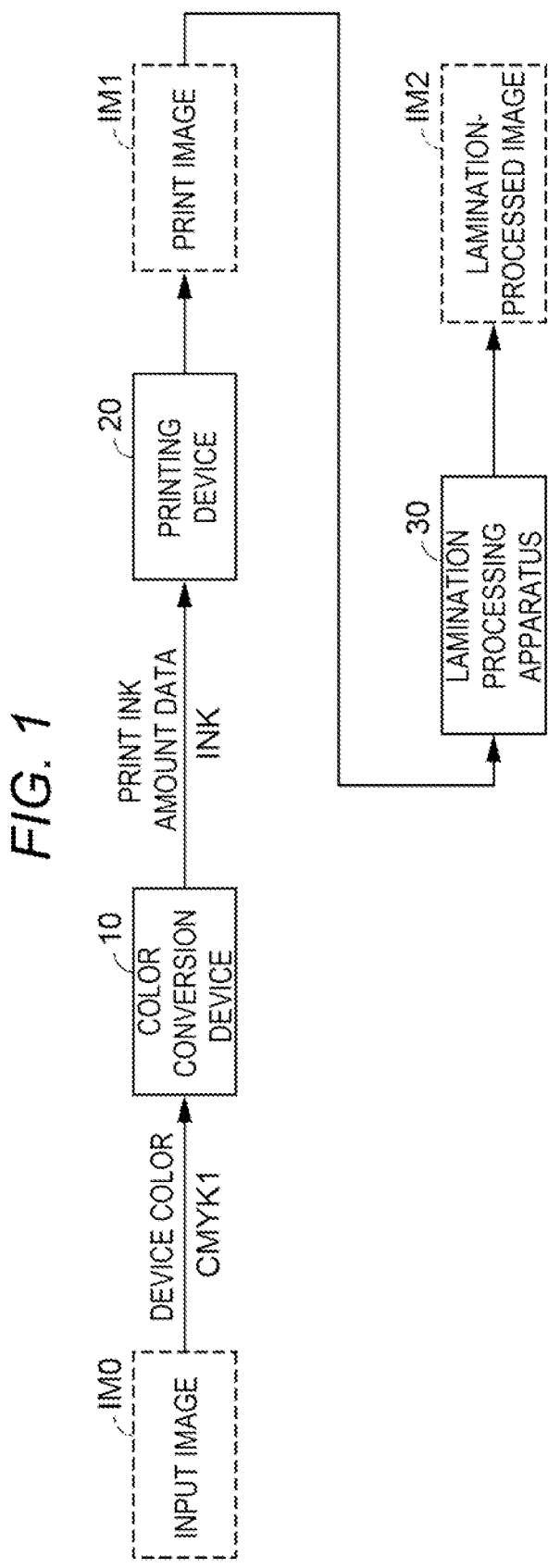
FIG. 1 is a diagram illustrating processing from printing of an input image to lamination processing.

Prior to a description of an image processing method and an image processing apparatus of the present disclosure, an outline of image processing assuming a case where a recording medium (printing paper) on which an image is recorded (printed) and a print image is formed is lamination-processed will be described with reference to FIG. 1. FIG. 1 is a diagram illustrating processing from printing of an input image to lamination processing.

A device color CMYK1 in which a color of an input image IM0 is represented in a CMYK color space is converted into print ink amount data INK by a color conversion device 10 and sent to a printing device 20. The color conversion device 10 converts the device color CMYK1 of the input image IM0 into the print ink amount data INK by performing conversion using a predetermined conversion table. The printing device 20 executes printing according to the print ink amount data INK and outputs a print image IM1. The print image IM1 is lamination-processed by a lamination processing apparatus 30 as desired by a user to obtain a lamination-processed image IM2.

Figure 2:
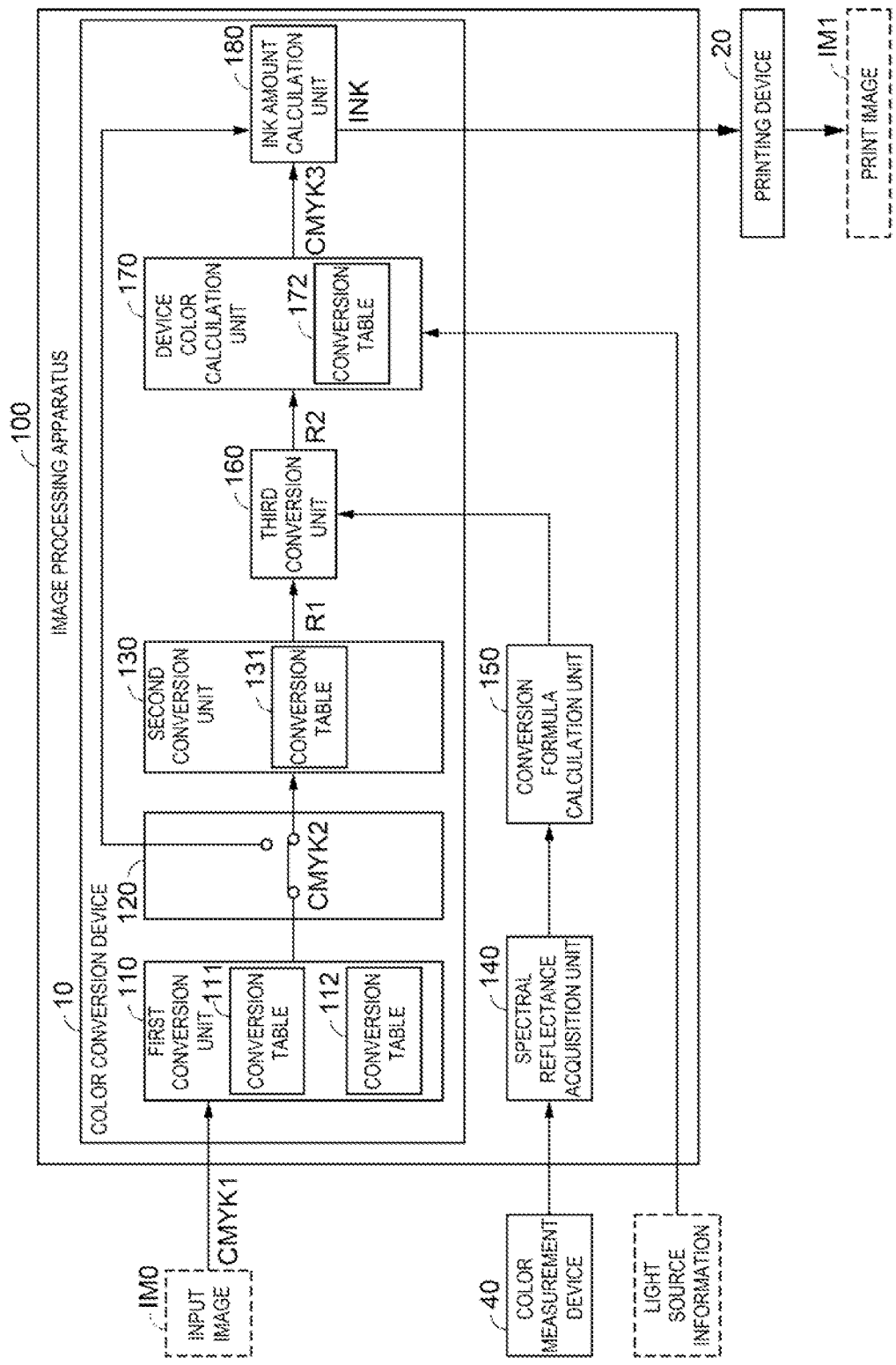
FIG. 2 is a diagram illustrating a schematic configuration of an image processing apparatus.

FIG. 2 is a diagram illustrating a schematic configuration of an image processing apparatus 100. The image processing apparatus 100 includes the color conversion device 10, a spectral reflectance acquisition unit 140, and a conversion formula calculation unit 150. The color conversion device 10 includes a first conversion unit 110, a changeover switch 120, a second conversion unit 130, a third conversion unit 160, a device color calculation unit 170, and an ink amount calculation unit 180.

Figure 3:
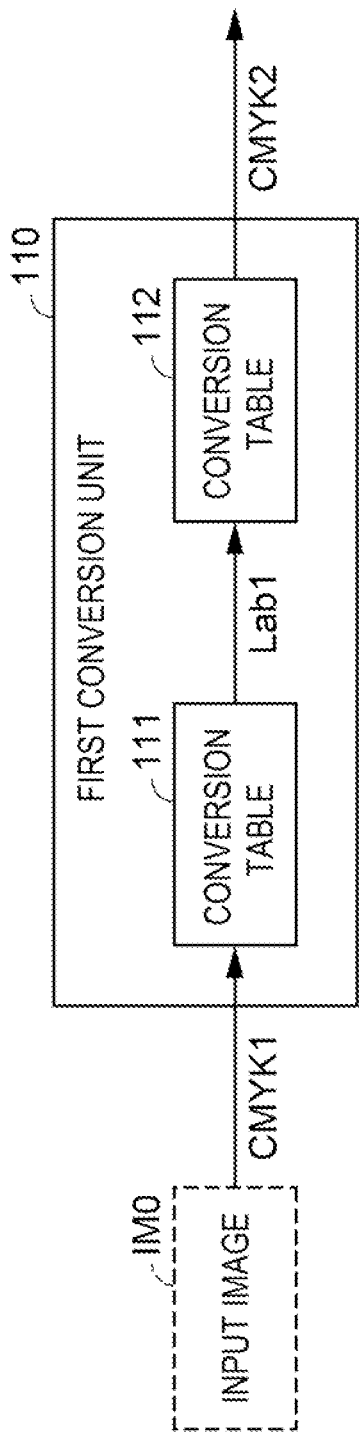
FIG. 3 is a diagram illustrating details of a first conversion unit.

FIG. 3 is a diagram illustrating details of the first conversion unit 110. The first conversion unit 110 includes a conversion table 111 that describes a correlation between a device-dependent color space such as the CMYK color space depending on a specific device that handles the input image IM0, that is, an input device, and a device-independent color space such as an international commission on illumination (CIE) L*a*b* color space that does not depend on the device. Further, the first conversion unit 110 includes a conversion table 112 that describes a correlation between a device-independent space and a device-dependent space such as the CMYK color space depending on the printing device 20 that is an output device. The first conversion unit 110 uses the conversion table 111 to convert a device color CMYK1 in the CMYK color space into a color value Lab1 in the CIE L*a*b* color space, and uses the conversion table 112 to convert the color value Lab1 into a device color CMYK2 in the CMYK color space. The device color CMYK1 corresponds to an input device color depending on the input device. The device color CMYK2 is an output device color depending on the output device, and corresponds to a first output device color. As the conversion table 111, an A2B table of an international color consortium (ICC) profile can be used, and as the conversion table 112, a B2A table of the ICC profile can be used.

When the lamination processing is not performed, the changeover switch 120 outputs the device color CMYK2 to the ink amount calculation unit 180. On the other hand, when the lamination processing is performed, the changeover switch 120 outputs the device color CMYK2 to the second conversion unit 130. When the lamination processing is performed, since the device color CMYK2 is a color to be reproduced after lamination processing, the device color CMYK2 is converted into a device color CMYK3 to be reproduced before lamination processing by the second conversion unit 130, the third conversion unit 160, and the device color calculation unit 170.

The second conversion unit 130 includes a conversion table 131 that shows a correspondence relationship between the output device color and the spectral reflectance, and converts the device color CMYK2 to a spectral reflectance $R1(N, \lambda)$ using the conversion table 131. The conversion table 131 is, for example, an A2B table of an ICC profile Ver.5 (ICC MAX) which is an output profile. The output profile may be a version before the ICC profile Ver.5. The spectral reflectance $R1(N, \lambda)$ is a value to be reproduced after lamination processing, and corresponds to a first spectral reflectance.

The spectral reflectance acquisition unit 140 acquires the spectral reflectance measured by a color measurement device 40 from the color measurement device 40. In the present embodiment, the spectral reflectance acquisition unit 140 acquires a spectral reflectance $Rb(N, \lambda)$ before lamination processing and a spectral reflectance $Ra(N, \lambda)$ after lamination processing. Here, N is a code for identifying a patch of a color chart, and λ is a wavelength. A range of the wavelength λ is from 380 nm to 730 nm, which is a range of visible light, and a step width of the wavelength λ is, for example, 10 nm. The range of the wavelength λ may be wider than the range from 380 nm to 730 nm. For example, a lower limit of the wavelength λ may be 360 nm, and an upper limit may be 800 nm. The step width of the wavelength λ is not limited to 10 nm, and may be any width.

The conversion formula calculation unit 150 calculates a mutual conversion formula between the spectral reflectance $Rb(N, \lambda)$ and the spectral reflectance $Ra(N, \lambda)$ by using the spectral reflectance $Rb(N, \lambda)$ before lamination processing and the spectral reflectance $Ra(N, \lambda)$ after lamination processing. The conversion formula calculation unit 150 stores the calculated mutual conversion formula in a storage device 104 (see FIG. 7) which will be described later. A plurality of mutual conversion formulas may be stored according to a type of lamination or the like. In this case, it is desirable to add a name for identifying the type and store the name.

Figure 4:
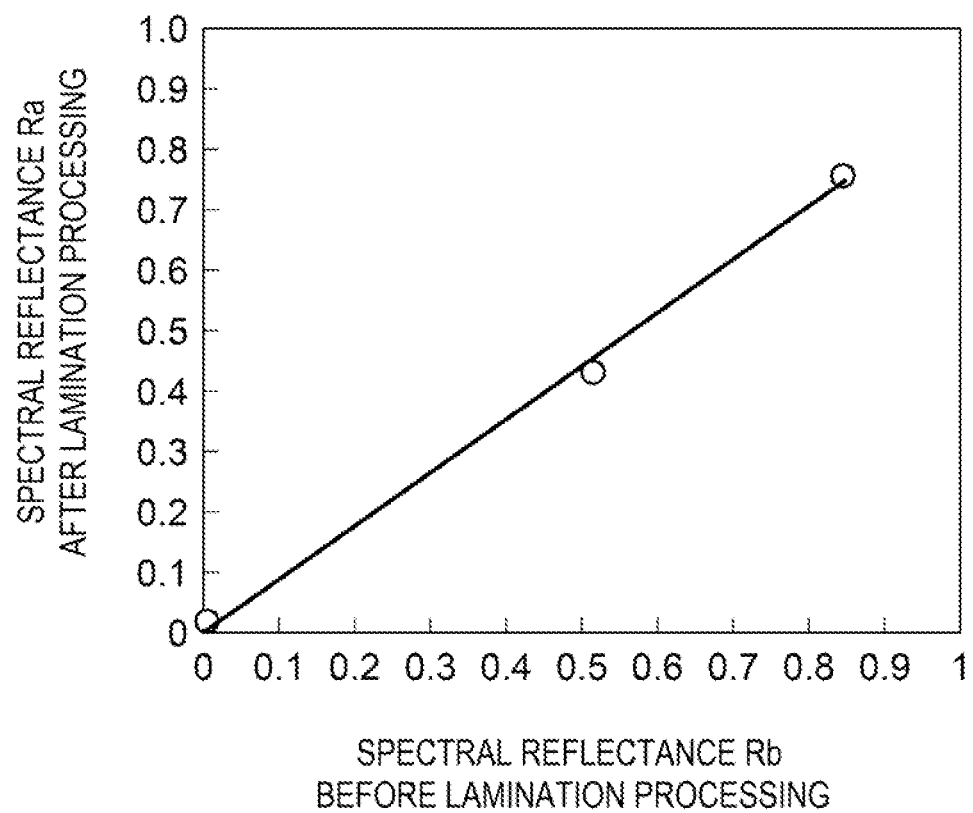
FIG. 4 is a graph showing a relationship between spectral reflectances before and after lamination processing.

FIG. 4 is a graph showing a relationship between the spectral reflectances before and after lamination processing. As can be seen from FIG. 4, there is a linear relationship between the spectral reflectance $Rb(N, \lambda)$ before lamination processing and the spectral reflectance $Ra(N, \lambda)$ after lamination processing, the mutual conversion formula can be expressed by the following formula (1), which is a linear formula.

$$Ra(N,\lambda)=A(\lambda)\cdot Rb(N,\lambda)+B(\lambda) \quad (1)$$

Here, coefficients $A(\lambda)$ and $B(\lambda)$ are expressed by the following formulas (2) and (3).

$$A(\lambda)=[\{Ra(w,\lambda)-Ra(k,\lambda)\}/\{Rb(w,\lambda)-Rb(k,\lambda)\} \quad (2)$$

$$B(\lambda)=-Rb(w,\lambda)\cdot[\{Ra(w,\lambda)-Ra(k,\lambda)\}/\{Rb(w,\lambda)-Rb(k,\lambda)\}]+Ra(w,\lambda) \quad (3)$$

In the formulas (2) and (3), $Rb(w, \lambda)$, $Rb(k, \lambda)$, $Ra(w, \lambda)$, and $Ra(k, \lambda)$ are defined as follows.

$Rb(w, \lambda)$: Reflectance of paper white before lamination processing $Rb(k, \lambda)$: Reflectance of black spot before lamination processing $Ra(w, \lambda)$: Reflectance of paper white after lamination processing $Ra(k, \lambda)$: Reflectance of black spot after lamination processing Here, the paper white means a portion where ink is not hit, and the black spot means a portion where black ink is hit. That is, in the present embodiment, the spectral reflectance acquisition unit 140 acquires spectral reflectances of two colors before and after lamination processing. Black ink means black (k) ink, but the black may be black formed using cyan (c), magenta (m), and yellow (y), or black (Richk) formed using cyan, magenta, yellow, and black.

The conversion formula calculation unit 150 may calculate the mutual conversion formula using three or more colors. In this case, the conversion formula calculation unit 150 can perform linear regression using the least squares method (method of least squares) to obtain the coefficients $A(\lambda)$ and $B(\lambda)$. The three or more colors preferably include paper white (white) and black spots (black). Further, the conversion formula is not limited to a primary formula, and may be a quadratic or higher-order conversion formula.

The third conversion unit 160 converts the spectral reflectance $R1(N, \lambda)$, that is calculated by the second conversion unit 130, into a spectral reflectance $R2(N, \lambda)$ using the mutual conversion formula calculated by the conversion formula calculation unit 150, as shown in the following formula (4).

$$R2(N,\lambda)=(R1(N,\lambda)-B(\lambda))/A(\lambda) \quad (4)$$

Here, the spectral reflectance $R2(N, \lambda)$ is a value to be reproduced before lamination processing, and corresponds to a second spectral reflectance.

Figure 5:
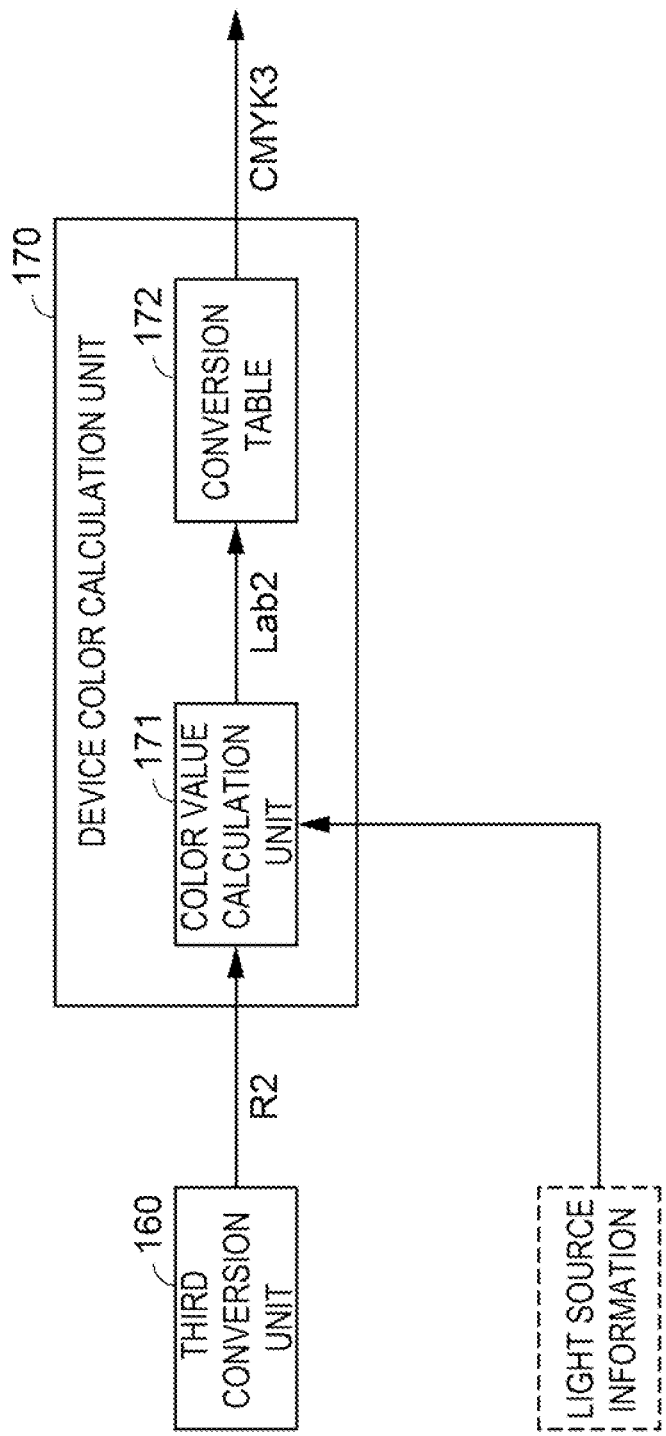
FIG. 5 is a diagram illustrating details of a device color conversion unit.
Figure 6:
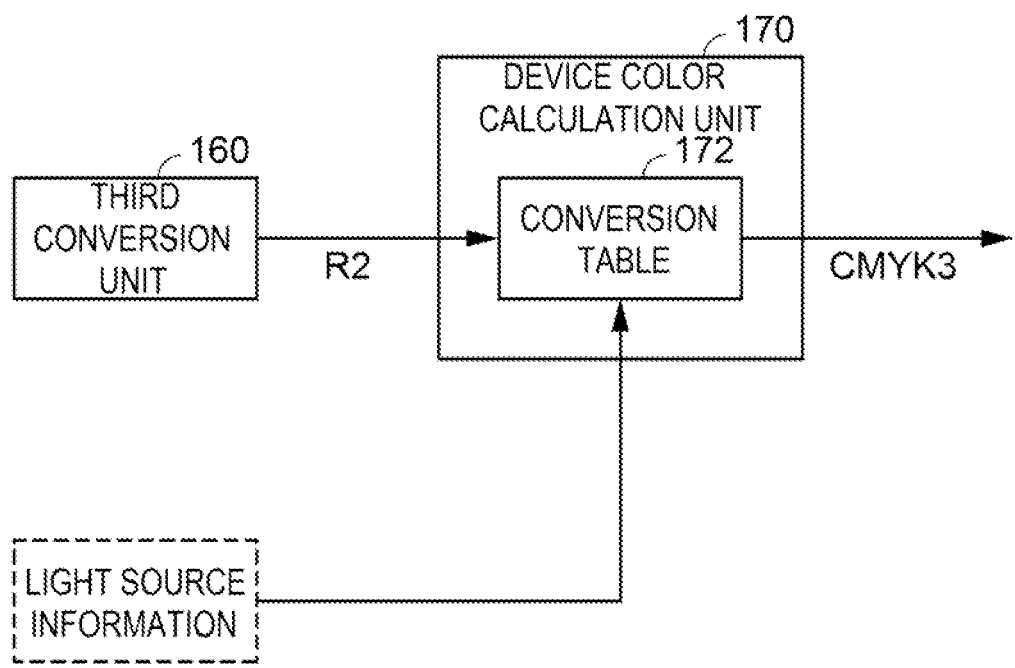
FIG. 6 is a diagram illustrating details of a modification of the device color conversion unit.

FIG. 5 is a diagram illustrating details of the device color calculation unit 170. The device color calculation unit 170 includes a color value calculation unit 171 that calculates the color value of the CIE L*a*b* color space, and a conversion table 172 that shows a correspondence relationship between the color value and the output device color, and calculates the device color CMYK3 using the spectral reflectance $R2(N, \lambda)$, the conversion table 172, and light source information. Specifically, the device color calculation unit 170 uses the light source information to convert the spectral reflectance $R2(N, \lambda)$ into a color value Lab2 in the CIE L*a*b* color space by the color value calculation unit 171, and then uses the conversion table 172 to convert the color value Lab2 into the device color CMYK3. The device color CMYK3 is an output device color and corresponds to a second output device color. The spectral reflectance $R2(N, \lambda)$ is a value calculated using the above formula (4). Further, as the light source information, information related to a light source used when the spectral reflectance Ra, Rb is measured by the color measurement device 40 is used, but it is desirable that information of a light source in an environment for observing a printed matter can be specified. As shown in FIG. 6, the spectral reflectance R2(N, λ) may be directly converted into the device color CMYK3 by using the conversion table 172 without being converted into the color value Lab2. In this case, the conversion table 172 is a conversion table indicating a correspondence relationship among the spectral reflectance, the output device color, and the light source information, and the color value calculation unit 171 is eliminated. The conversion table 172 is, for example, the B2A table of the ICC profile Ver.5 (ICC MAX), which is the output profile.

When the lamination processing is performed, the ink amount calculation unit 180 converts the device color CMYK3 calculated by the device color calculation unit 170 into the print ink amount data INK at a time of printing performed by a printer. When the lamination processing is not performed, the ink amount calculation unit 180 converts the device color CMYK2 calculated by the first conversion unit 110 into the print ink amount data INK. When the printing device 20 performs the printing using the print ink amount data INK calculated by the ink amount calculation unit 180, a print image IM1 is obtained.

Figure 7:
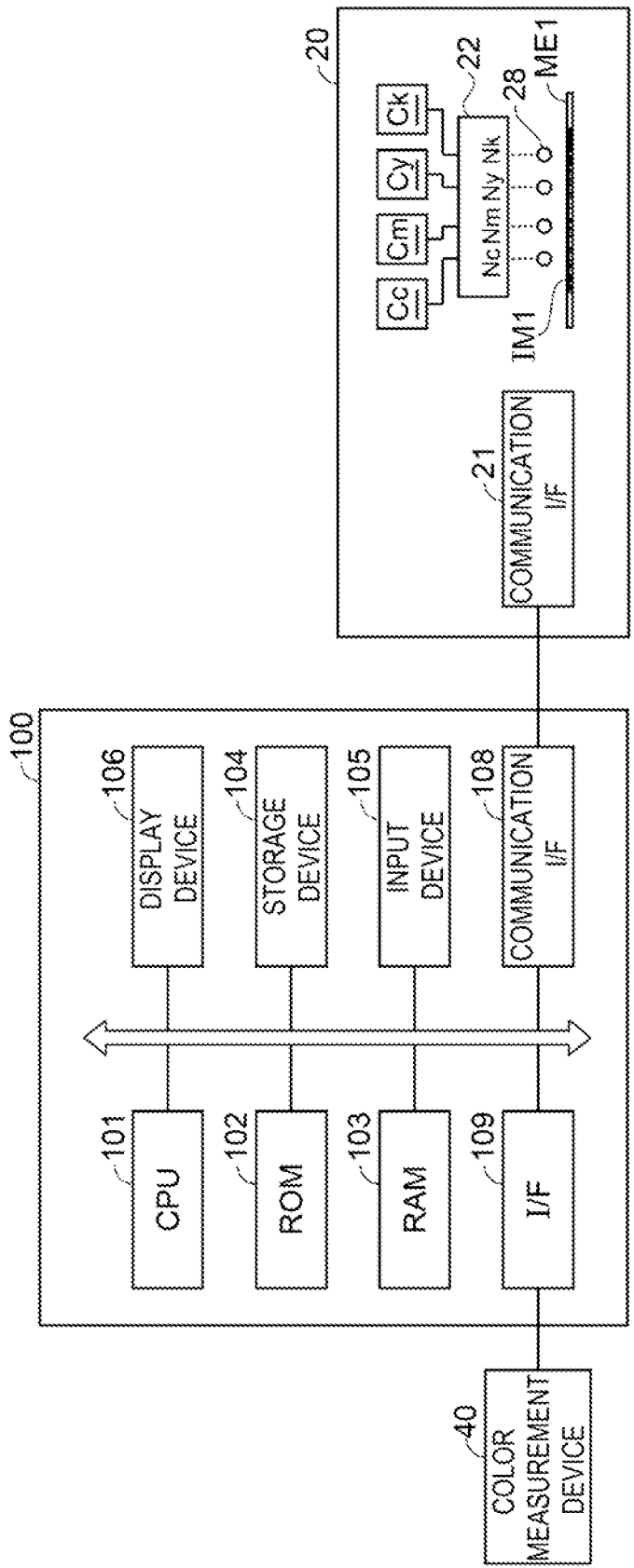
FIG. 7 is a block diagram showing a hardware configuration of an image processing apparatus.

FIG. 7 is a block diagram showing a hardware configuration of the image processing apparatus 100.

The image processing apparatus 100 includes a central processing unit (CPU) 101 as a processing unit, a read only memory (ROM) 102, a random access memory (RAM) 103, the storage device 104, an input device 105, a display device 106, a communication interface (I/F) 108, and an I/F 109 for the color measurement device 40. The image processing apparatus 100 performs control of color management using the international color consortium (ICC) profile, a print job for causing the printing device 20 to perform the printing, or the like. Units of the image processing apparatus 100 are coupled to one another via a bus and are capable of inputting and outputting information to and from each other. The ROM 102, the RAM 103, and the storage device 104 are memories, and at least the ROM 102 and the RAM 103 are semiconductor memories. A liquid crystal display panel or the like can be used as the display device 106. The image processing apparatus 100 can be configured using a personal computer. A part or all of the image processing apparatus 100 may be incorporated in the printing device 20.

The storage device 104 stores an operating system (OS) (not shown), various programs, or the like. As the storage device 104, a nonvolatile semiconductor memory such as a flash memory or a magnetic storage device such as a hard disk can be used. The RAM 103 is a storage medium that secures an area for storing a program in which the CPU 101 operates, a work area for operating the program, or the like, and the ROM 102 is a storage medium that stores a program executed when the image processing apparatus 100 is started, various types of information, or the like.

The CPU 101 appropriately reads the program stored in the storage device 104 into the RAM 103, executes the read program to perform various types of processing, and generates the print ink amount data INK for causing the printing device 20 to execute the printing. Components in the color conversion device 10 described above, the spectral reflectance acquisition unit 140, and the conversion formula calculation unit 150 are realized by the CPU 101 executing the various programs stored in the storage device 104.

As the input device 105, a pointing device, a hard key including a keyboard, a touch panel attached to a surface of a display panel, or the like can be used. The communication I/F 108 is coupled to a communication I/F 21 of the printing device 20, and inputs and outputs the information such as the print ink amount data INK to and from the printing device 20. The I/F 109 for the color measurement device 40 is coupled to the color measurement device 40, and acquires color measurement data including a color measurement value from the color measurement device 40. As standards of the communication I/Fs 108 and 21 and the I/F 109 for the color measurement device 40, a universal serial bus (USB), a short-range wireless communication standard, or the like can be used. The communication may be wired or wireless, and may be network communication of such as a local area network (LAN) or the Internet.

The printing device 20 is an inkjet printer that forms the print image IM1 by ejecting various types of ink from a recording head 22 based on the print ink amount data INK generated by the image processing apparatus 100. For example, in a case of the recording head 22 that ejects C ink, M ink, Y ink, and K ink, the recording head 22 is supplied with the CMYK ink from ink cartridges Cc, Cm, Cy, and Ck, and ejects CMYK ink droplets 28 from nozzles Nc, Nm, Ny, and Nk, respectively. When the ink droplets 28 land on a recording medium ME1, ink dots are formed on the recording medium ME1. As a result, the printed matter having the print image IM1 on the recording medium ME1 is obtained.

The color measurement device 40 performs color measurement of an object to be measured, and outputs a color measurement result as the color measurement data. In the color measurement device 40 of the present embodiment, a color chart CT1 formed by the printing device 20 performing printing on the recording medium ME1 and a color chart CT2 obtained by the lamination processing apparatus 30 lamination-processing the color chart CT1 are used as the object to be measured. That is, the color measurement device 40 can measure a color of each patch of the color chart CT1 before lamination processing and the color chart CT2 after lamination processing, and can output the spectral reflectances Rb and Ra and the color measurement value as the color measurement data. The patch is also called a color chart. The color measurement value is, for example, a value representing brightness L* in the CIE L*a*b* color space and chromaticity coordinates a* and b*. The image processing apparatus 100 acquires the color measurement data from the color measurement device 40 and performs the various types of processing. The color measurement device 40 may be incorporated in the printing device 20.

Figure 8:
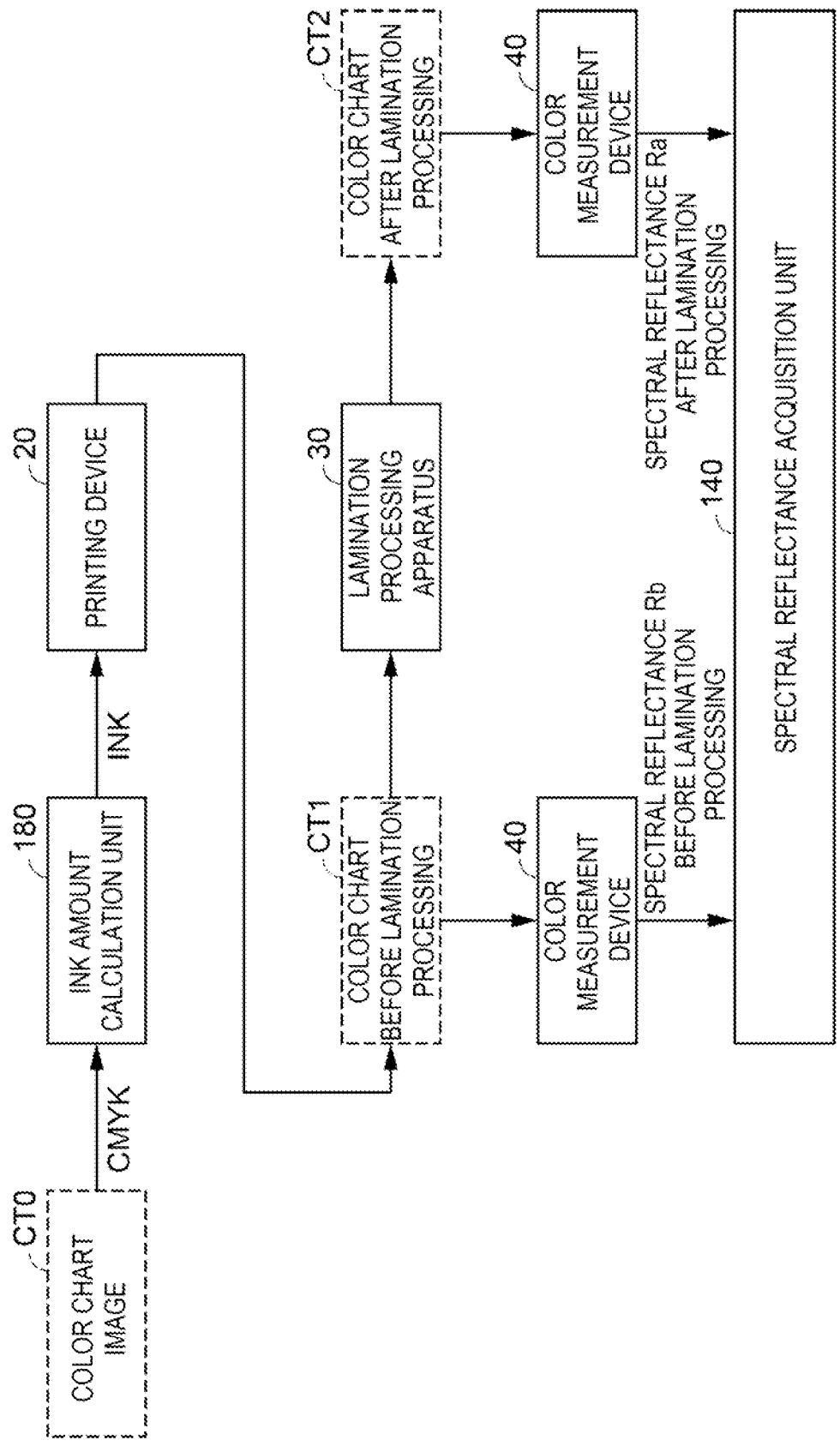
FIG. 8 is a diagram illustrating a flow of processing related to measurement of spectral reflectance.

FIG. 8 is a diagram illustrating a flow of processing related to the measurement of the spectral reflectances Rb and Ra.

As described above, the color charts CT1 and CT2 on which the color measurement is performed by the color measurement device 40 are generated by using the printing device 20 and the lamination processing apparatus 30. Specifically, as shown in FIG. 8, in the image processing apparatus 100, a color chart image CT0 represented in the CMYK color space depending on the printing device 20 is stored, and the color chart image CT0 is converted into the print ink amount data INK by the ink amount calculation unit 180. The printing device 20 performs the printing using the print ink amount data INK to generate the color chart CT1 before lamination processing. The spectral reflectance is measured by the color measurement device 40 using the color chart CT1, and the measurement result is input to the spectral reflectance acquisition unit 140 as the spectral reflectance Rb before lamination processing. Thereafter, when the color chart CT1 is lamination-processed by the lamination processing apparatus 30, the color chart CT2 after lamination processing is generated. The spectral reflectance is measured by the color measurement device 40 using the color chart CT2, and the measurement result is input to the spectral reflectance acquisition unit 140 as the spectral reflectance Ra after lamination processing. In this example, the color chart CT2 is generated by performing the lamination processing after the color chart CT1 is subjected to the color measurement, but two color charts CT1 are generated by the printing device 20, and one of the two may be lamination-processed to generate the color chart CT2.

Figure 9:
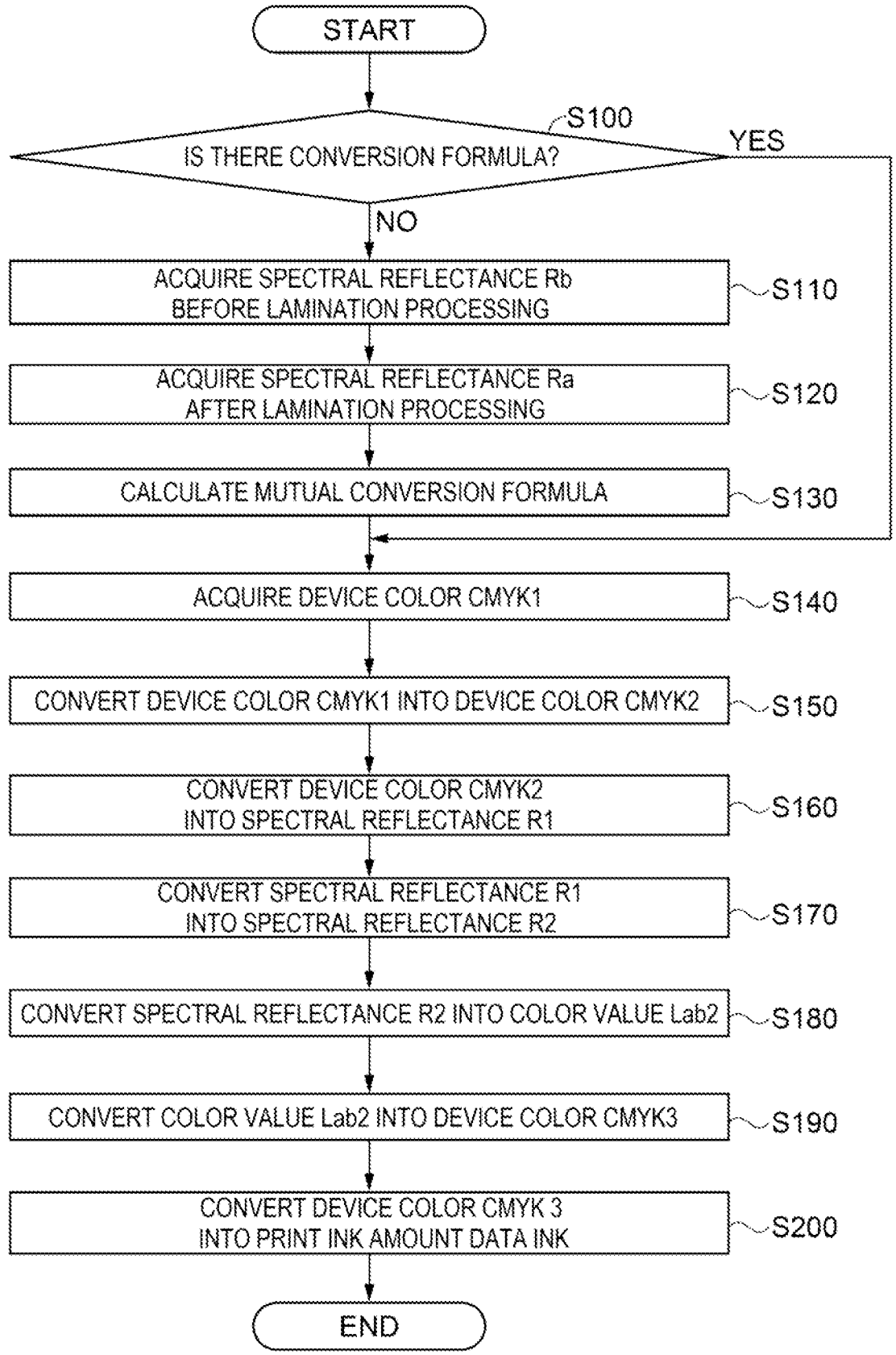
FIG. 9 is a flowchart showing a color conversion step when the lamination processing is performed.

FIG. 9 is a flowchart showing a color conversion step when the lamination processing is performed on the printed matter.

In step S100, a user determines whether the mutual conversion formula represented by the formula (1) is stored in the storage device 104 of the image processing apparatus 100. The mutual conversion formula may be provided by, for example, a manufacturer of the printing device 20. When there is the mutual conversion formula, the user moves the processing to step S140, and when there is no mutual conversion formula, the processing proceeds to step S110, and the mutual conversion formula is calculated.

In step S110, the user measures the spectral reflectance Rb(N, $\lambda$) of the color chart CT1 before lamination processing in the color measurement device 40, and the spectral reflectance acquisition unit 140 acquires the spectral reflectance Rb(N, $\lambda$). The user performs the lamination processing on the color chart CT1 before lamination processing by the lamination processing apparatus 30. In step S120, the user measures the spectral reflectance Ra(N, $\lambda$) of the color chart CT2 after lamination processing in the color measurement device 40, and the spectral reflectance acquisition unit 140 acquires the spectral reflectance Ra(N, $\lambda$). In step S130, the user causes the conversion formula calculation unit 150 to calculate the mutual conversion formula between the spectral reflectance Rb(N, $\lambda$) before lamination processing and the spectral reflectance Ra(N, $\lambda$) after lamination processing. As described above, when two colors are used, a straight line passing through two points is calculated, and when the three or more colors are used, the linear regression is performed using the method of least squares, and a linear approximation is performed. In addition to the linear approximation, it is also possible to perform an approximation on a quadratic or higher-order polynomial. When three or more colors are used, the user may select colors including paper white (white) and the black spot (black) and colors each having a spectral reflectance that is substantially intermediate between white and black as other colors.

In step S140, the user causes the first conversion unit 110 to acquire the device color CMYK1 of the input image IM0. The input image IM0 may be acquired from the ROM 102, the RAM 103, or the storage device 104 of the image processing apparatus 100. Alternatively, the input image IM0 may be acquired via an external storage medium (not shown) such as a USB memory, or via the Internet, or the like.

In step S150, the user causes the first conversion unit 110 to convert the input device color CMYK1 into the device color CMYK2 depending on the printing device 20 with reference to the conversion tables 111 and 112.

In step S160, the user causes the second conversion unit 130 to convert the device color CMYK2 into the spectral reflectance R1(N, $\lambda$) with reference to the conversion table 131.

In step S170, the user causes the third conversion unit 160 to convert the spectral reflectance R1(N, $\lambda$) into the spectral reflectance R2(N, $\lambda$) by the mutual conversion formula calculated by the conversion formula calculation unit 150.

In step S180 and step S190, the user causes the device color calculation unit 170 to calculate the device color CMYK3 using the spectral reflectance R2(N, $\lambda$), the conversion table 172, and the light source information. Specifically, in step S180, the user causes the color value calculation unit 171 to convert the spectral reflectance R2(N, $\lambda$) into the color value Lab2 in the CIE L*a*b* color space by specifying the light source information. Thereafter, in step S190, the user causes the device color calculation unit 170 to convert the color value Lab2 into the device color CMYK3 by using the conversion table 172.

In step S200, the user causes the ink amount calculation unit 180 to convert the device color CMYK3 into the print ink amount data INK.

As a result, the print ink amount data INK is output to the printing device 20 from the image processing apparatus 100, and the print image IM1 is formed on the recording medium ME1 by the printing device 20. When the lamination processing is performed on the recording medium ME1 by the lamination processing apparatus 30, the same color as the print image IM1 in the case where the lamination processing is not performed, that is, the print image IM1 in the case where the ink amount calculation unit 180 generates the print ink amount data INK based on the device color CMYK2, is reproduced in the lamination-processed image IM2 obtained by lamination processing the recording medium ME1.

As described above, according to the present embodiment, the color after lamination processing is reproduced by converting the device color CMYK1 depending on the input device into the device color CMYK2 depending on the printing device 20 that is the output device, converting the device color CMYK2 into the spectral reflectance R1(N, $\lambda$) to be reproduced after lamination processing, converting the spectral reflectance R1(N, $\lambda$) into the spectral reflectance R2(N, $\lambda$), to be reproduced before lamination processing, using the mutual conversion formula of the spectral reflectances before and after lamination processing, and converting spectral reflectance R2(N, $\lambda$) into the device color CMYK3, to be reproduced before lamination processing, using the spectral reflectance R2(N, $\lambda$), the light source information, and the conversion table 172. That is, since the profile after lamination processing is eliminated, it is possible to reduce time and effort required for creating and managing the profile.

Further, according to the present embodiment, the mutual conversion formula of the spectral reflectances is calculated by acquiring the spectral reflectances Rb of at least two or more colors before lamination processing and acquiring the spectral reflectances Ra of the colors after lamination processing. Therefore, the mutual conversion formula between the spectral reflectance Rb before lamination processing and the spectral reflectance Ra after lamination processing can be easily calculated.

According to the present embodiment, since the output profile including the conversion tables 131 and 172 is the ICC profile, conversion processing can be easily performed.

Further, according to the present embodiment, since the light source information can be specified when the device color CMYK3 is calculated by the device color calculation unit 170, it is possible to perform appropriate image processing in consideration of the light source information.

The above embodiment may be modified as follows.

In the above embodiment, the device color of the CMYK color space is used as the input device color and the output device color, and one or both of the input device color and the output device color may be a device color of an RGB color space.

In the above embodiment, the formula (1) is used as the mutual conversion formula between the spectral reflectance Rb(N, λ) before lamination processing and the spectral reflectance Ra(N, λ) after lamination processing, and the following formula (5) in which the spectral reflectance Rb(N, λ) and the spectral reflectance Ra(N, λ) are replaced may be used.

$$Rb(N,\lambda)=C(\lambda)\cdot Ra(N,\lambda)+D(\lambda) \quad (5)$$

Here, coefficients C(λ) and D(λ) are expressed by the following formulas (6) and (7).

$$C(\lambda)=[\{Rb(w,\lambda)-Rb(k,\lambda)\}/\{Ra(w,\lambda)-Ra(k,\lambda)\}] \quad (6)$$

$$D(\lambda)=-Ra(w,\lambda)\cdot[\{Rb(w,\lambda)-Rb(k,\lambda)\}/\{Ra(w,\lambda)-Ra(k,\lambda)\}]+Rb(w,\lambda) \quad (7)$$

In this case, the third conversion unit 160 converts the spectral reflectance R1(N, λ) into the spectral reflectance R2(N, λ) based on the following formula (8).

$$R2(N,\lambda)=C(\lambda)\cdot R1(N,\lambda)+D(\lambda) \quad (8)$$

In the above embodiment, the first conversion unit 110 converts the device color CMYK1 into the color value Lab1, and converts the color value Lab1 into the device color CMYK2, but the first conversion unit 110 may convert the device color CMYK1 to the spectral reflectance, and convert the spectral reflectance to the device color CMYK2.

What is claimed is:

1. An image processing method, comprising:
    converting an input device color depending on an input device into a first output device color that is an output device color depending on an output device;
    converting the first output device color into a first spectral reflectance using an output profile showing a relationship between the output device color and a spectral reflectance;
    converting the first spectral reflectance into a second spectral reflectance, to be reproduced before lamination processing, using a mutual conversion formula of a spectral reflectance before lamination processing and a spectral reflectance after lamination processing; and
    calculating a second output device color that is an output device color using the second spectral reflectance, the output profile, and light source information.

2. The image processing method according to claim 1, further comprising:
    acquiring spectral reflectances before lamination processing of at least two or more colors;
    acquiring spectral reflectances after lamination processing of the at least two or more colors; and
    calculating the mutual conversion formula using the spectral reflectances before lamination processing and the spectral reflectances after lamination processing.

3. The image processing method according to claim 1, wherein
    the output profile is an ICC profile.

4. The image processing method according to claim 1, wherein
    in the calculating the second output device color, the light source information is able to be specified.

5. The image processing method according to claim 1, wherein
    the calculating the second output device color includes:
        converting the second spectral reflectance into a color value using the light source information; and
        converting the color value into the second output device color using the output profile.

6. An image processing apparatus, comprising:
    a first conversion unit configured to convert an input device color depending on an input device into a first output device color that is an output device color depending on an output device;
    a second conversion unit configured to convert the first output device color into a first spectral reflectance using an output profile showing a relationship between the output device color and a spectral reflectance;
    a third conversion unit configured to convert the first spectral reflectance into a second spectral reflectance, to be reproduced before lamination processing, using a mutual conversion formula of a spectral reflectance before lamination processing and a spectral reflectance after lamination processing; and
    a device color calculation unit configured to calculate a second output device color that is an output device color using the second spectral reflectance, the output profile, and light source information.

7. The image processing apparatus according to claim 6, further comprising:
    a spectral reflectance acquisition unit configured to acquire spectral reflectances before lamination processing of at least two or more colors and spectral reflectances after lamination processing of the at least two or more colors; and
    a conversion formula calculation unit configured to calculate the mutual conversion formula using the spectral reflectances before lamination processing and the spectral reflectances after lamination processing.

8. The image processing apparatus according to claim 6, wherein
    the output profile is an ICC profile.

9. The image processing apparatus according to claim 6, wherein
    in the device color calculation unit, the light source information is able to be specified.

10. The image processing apparatus according to claim 6, wherein
    the device color calculation unit converts the second spectral reflectance into a color value using the light source information, and converts the color value into the second output device color using the output profile.

* * * * *